(12) United States Patent
Watanabe et al.

(10) Patent No.: US 8,831,982 B2
(45) Date of Patent: Sep. 9, 2014

(54) FISCAL BOARD RECEIVING CASE AND FISCAL PRINTER

(75) Inventors: Toshiaki Watanabe, Shiojiri (JP); Tsukasa Abe, Higashichikuma-gun (JP); Tsuyoshi Wasamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

(21) Appl. No.: 12/987,041

(22) Filed: Jan. 7, 2011

(65) Prior Publication Data

US 2011/0169385 A1    Jul. 14, 2011

(30) Foreign Application Priority Data

Jan. 9, 2010    (JP) ................................ 2010-003449

(51) Int. Cl.
*G07G 5/00* (2006.01)
*G06F 21/86* (2013.01)
*B41J 29/38* (2006.01)
*B41J 29/13* (2006.01)
*B41J 29/02* (2006.01)

(52) U.S. Cl.
CPC ... *G07G 5/00* (2013.01); *G06F 21/86* (2013.01); *B41J 29/38* (2013.01); *B41J 29/13* (2013.01); *B41J 29/02* (2013.01)
USPC ............................................. 705/28; 705/24

(58) Field of Classification Search
USPC .......................................................... 705/28
See application file for complete search history.

(56) References Cited

U.S. PATENT DOCUMENTS

| | | | |
|---|---|---|---|
| 6,199,049 B1 * | 3/2001 | Conde et al. | 705/24 |
| 7,523,320 B2 * | 4/2009 | Hodder et al. | 713/194 |
| 7,782,198 B2 * | 8/2010 | Crockett et al. | 340/541 |
| 7,913,097 B2 * | 3/2011 | Hodder et al. | 713/194 |
| 8,339,632 B2 * | 12/2012 | Wasamoto et al. | 358/1.14 |

FOREIGN PATENT DOCUMENTS

| | | |
|---|---|---|
| JP | 03-091297 A | 4/1991 |
| JP | 05-120567 A | 5/1993 |
| JP | 11-112164 A | 4/1999 |
| WO | WO 2007/102121 A2 | 9/2007 |

* cited by examiner

*Primary Examiner* — Garcia Ade

(57) ABSTRACT

A fiscal board receiving case is provided. A management board receiving case includes a case main body and a lid connected to the case main body and receives a management board on which a memory storing data including fiscal information and a management board-side connector are mounted. A control board receiving case includes a case main body and a lid connected to the case main body and receives a control board on which a controller and a control board-side connector connected to the management board-side connector are mounted. The management board receiving case and the control board receiving case are configured such that one box-like body that receives at least the management board is formed while the management board-side connector and the control board-side connector are connected to each other by engaging the management board receiving case with the control board receiving case through engagement members provided in the cases. The management board receiving case and the control board receiving case are configured such that engagement between the cases and engagement between the case main body and the lid in each of the cases are irreversibly maintained after the cases are engaged with each other.

5 Claims, 10 Drawing Sheets

FISCAL BOARD RECEIVING CASE AND FISCAL PRINTER

The disclosure of Japanese Patent Application No. 2010-003449 filed on Jan. 9, 2010, including specification, drawings and claims are incorporated herein by reference in its entirety.

BACKGROUND

The present invention relates to a fiscal board receiving case that receives a board on which a memory storing data including fiscal information is mounted, and a fiscal printer.

In the past, a device such as an electronic cash register has been known (for example, see Patent Document 1). The device is installed in a shop or the like where goods are sold or services are provided, and includes a writable nonvolatile memory (fiscal ROM) that stores fiscal information including information on the sales transactions of goods and the like (information on the goods or sales in accounting or the like or information on taxation and the like). The fiscal information stored in the memory is utilized as information that is used to determine the exact state of transactions in a shop when, for example, the state institution such as a government collects taxes from the shop.

Patent Document 1: JP-A-05-120567

Since the fiscal information stored in the memory is utilized as the information used to determine the exact state of transactions (accounting) in the shop as described above, the fiscal information stored in the memory needs to be prevented from being falsified. Further, in some countries, the prevention of the falsification of the fiscal information stored in the memory is a legal requirement.

SUMMARY

It is therefore an object of at least one embodiment of the present invention to prevent the falsification of data stored in a memory in a fiscal board receiving case that receives a board on which the memory storing data including fiscal information is mounted.

In order to achieve at least one of the above-described objects, according to one aspect of the embodiments of the present invention, there is provided a fiscal board receiving case, comprising: a management board receiving case that includes a case main body and a lid connected to the case main body and receives a management board on which a memory storing data including fiscal information and a management board-side connector are mounted; and a control board receiving case that includes a case main body and a lid connected to the case main body and receives a control board on which a controller and a control board-side connector connected to the management board-side connector are mounted, wherein the management board receiving case and the control board receiving case are configured such that one box-like body that receives at least the management board is formed while the management board-side connector and the control board-side connector are connected to each other by engaging the management board receiving case with the control board receiving case through engagement members provided in the cases, and wherein the management board receiving case and the control board receiving case are configured such that engagement between the cases and engagement between the case main body and the lid in each of the cases are irreversibly maintained after the cases are engaged with each other.

With this configuration, after one box-like body for receiving at least the management board while access from the outside is not possible is formed by engaging the management board receiving case with the control board receiving case, it may not be possible to separate these cases. Accordingly, after these cases are engaged with each other, a state where physical access to the management board on which the memory is mounted is not possible is maintained. Therefore, it is possible to prevent the falsification of data that is performed through physical access to the memory.

In the fiscal board receiving case, the management board-side connector may be exposed from one side surface of the management board receiving case and the control board-side connector may be exposed from one side surface of the control board receiving case, and the management board receiving case and the control board receiving case may be configured such that the one box-like body is formed while the management board-side connector and the control board-side connector are connected to each other by engaging the management board receiving case with the control board receiving case through the engagement members provided in the cases in a state where the one side surface of the management board receiving case faces the one side surface of the control board receiving case.

With this configuration, it may be possible to engage the management board receiving case with the control board receiving case in a state where the management board-side connector is connected to the control board-side connector.

In the fiscal board receiving case, an external device connector which is connectable to an external device may be mounted on the management board, the management board receiving case may be formed with a connector hole through which the external device connector is exposed to the outside of the management board receiving case, and the connector hole may be formed such that the connector hole is closed by the external device connector when the external device connector passes through the connector hole.

With this configuration, it may be possible to prevent physical access to the memory through the connector hole.

In the fiscal board receiving case, the data including the fiscal information may be stored in the memory after being encrypted.

With this configuration, it may he possible to prevent the falsification of data, which is performed through physical access to the memory, while preventing the illegal reading of the data stored in the memory.

According to another aspect of the embodiments of the present invention, there is provided a fiscal printer, comprising a fiscal board receiving case including: a management board receiving case that includes a case main body and a lid connected to the case main body and receives a management board on which a memory storing data including fiscal information and a management board-side connector are mounted; and a printer board receiving case that includes a case main body and a lid connected to the case main body and receives a printer board on which a printer controller and a printer board-side connector connected to the management board-side connector are mounted, wherein the management board receiving case and the printer board receiving case are configured such that one box-like body that receives at least the management hoard is formed while the management board-side connector and the printer board-side connector are connected to each other by engaging the management board receiving case with the printer board receiving case through engagement members provided in the cases, and wherein the management board receiving case and the printer board receiving case are configured such that engagement between the cases and engagement between the case main body and the lid in each of the cases are irreversibly maintained after the cases are engaged with each other.

With this configuration, after one box-like body for receiving at least the management board while access from the outside is not possible is formed by engaging the management board receiving case with the control board receiving case, it may not be possible to separate these cases. Accordingly, after these cases are engaged with each other, a state where physical access to the management board on which the memory is mounted is not possible is maintained. Therefore, it is possible to provide a fiscal printer capable of preventing the falsification of data that is performed through physical access to the memory.

According to the invention, it may be possible to prevent the falsification of data stored in a memory in a fiscal board receiving case that receives a board on which the memory storing data including fiscal information is mounted and a fiscal printer including the fiscal board receiving case.

DETAILED DESCRIPTION OF THE EMBODIMENTS

An embodiment of the invention will be described below with reference to the drawings.

Figure 1:
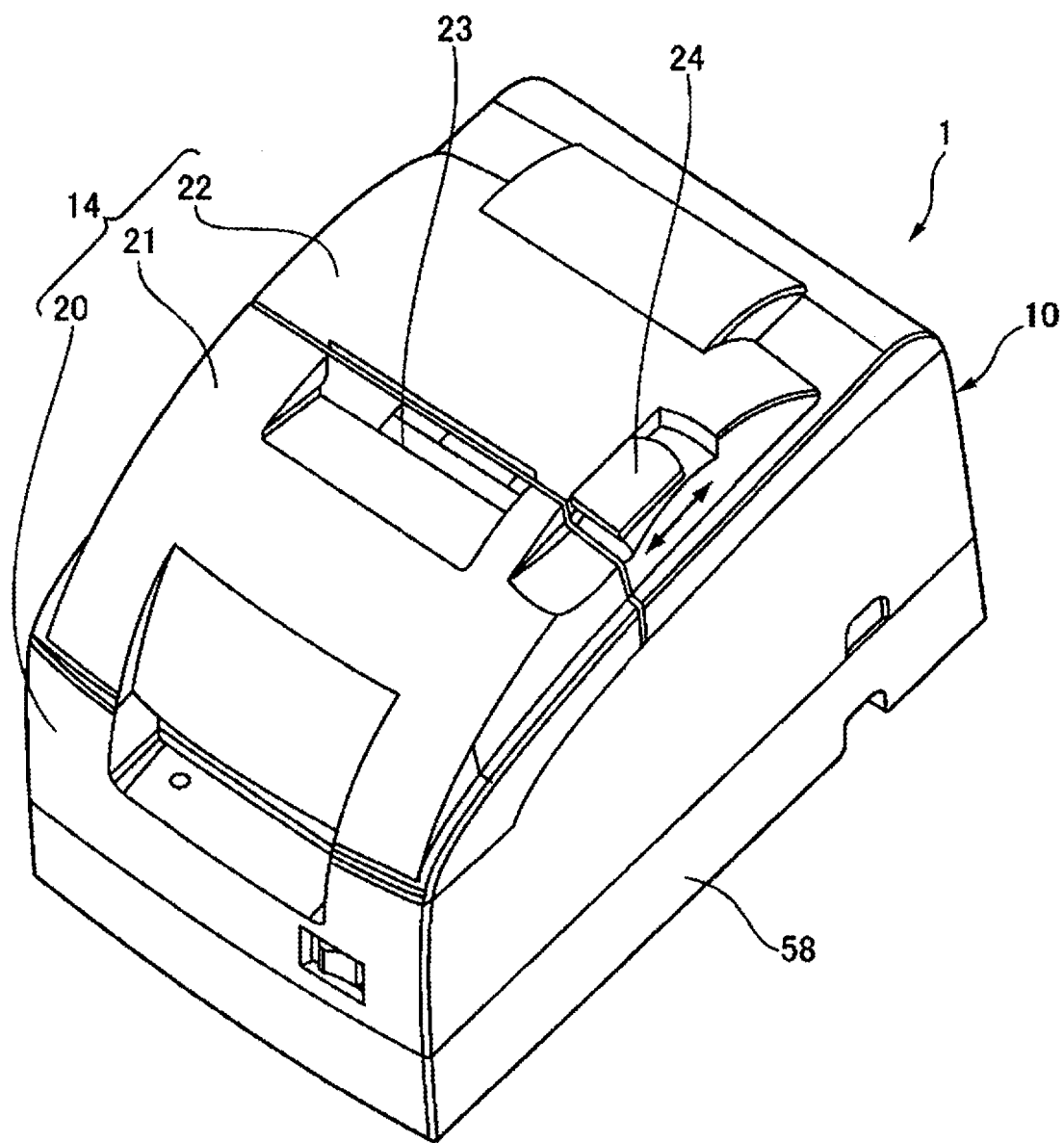
FIG. 1 is a perspective view showing the appearance of a fiscal printer according to this embodiment.
Figure 2:
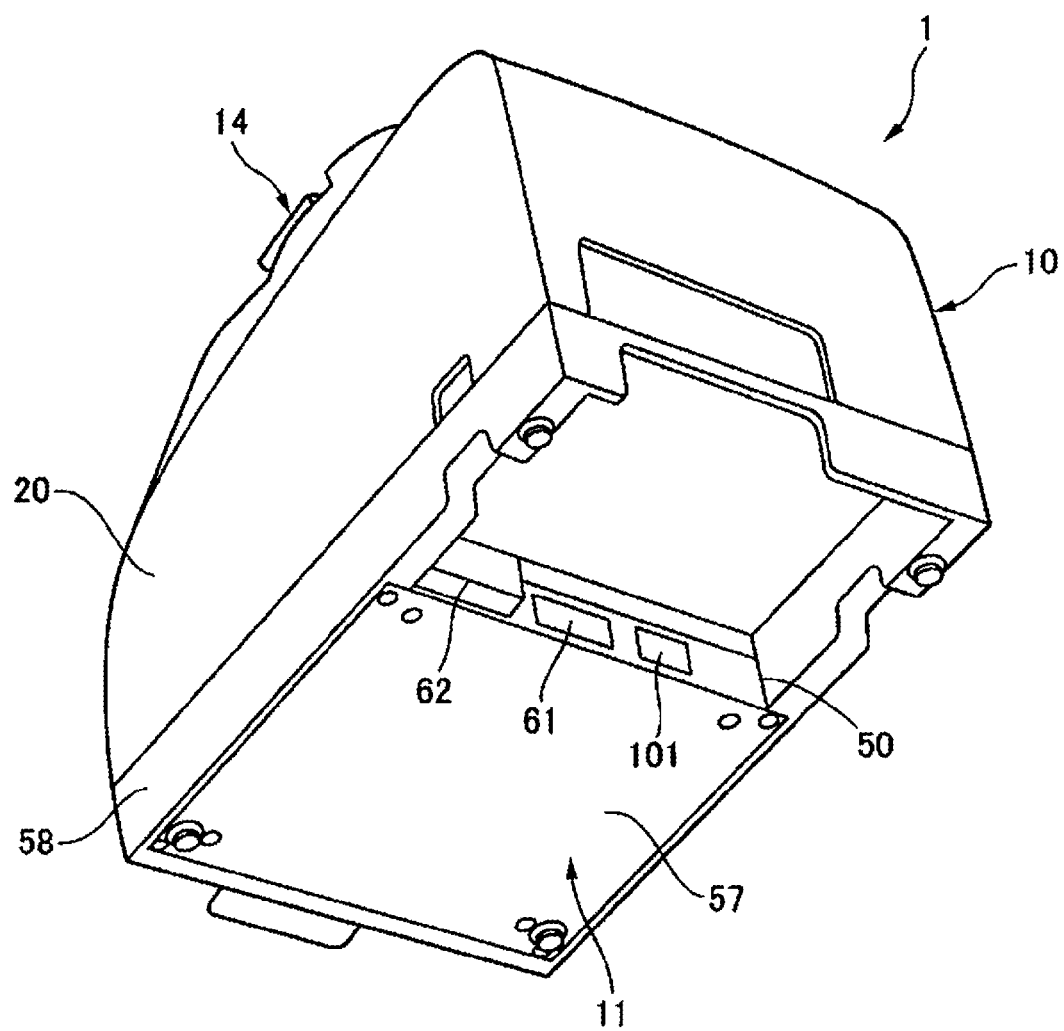
FIG. 2 is a perspective view showing the appearance of the fiscal printer.
Figure 3:
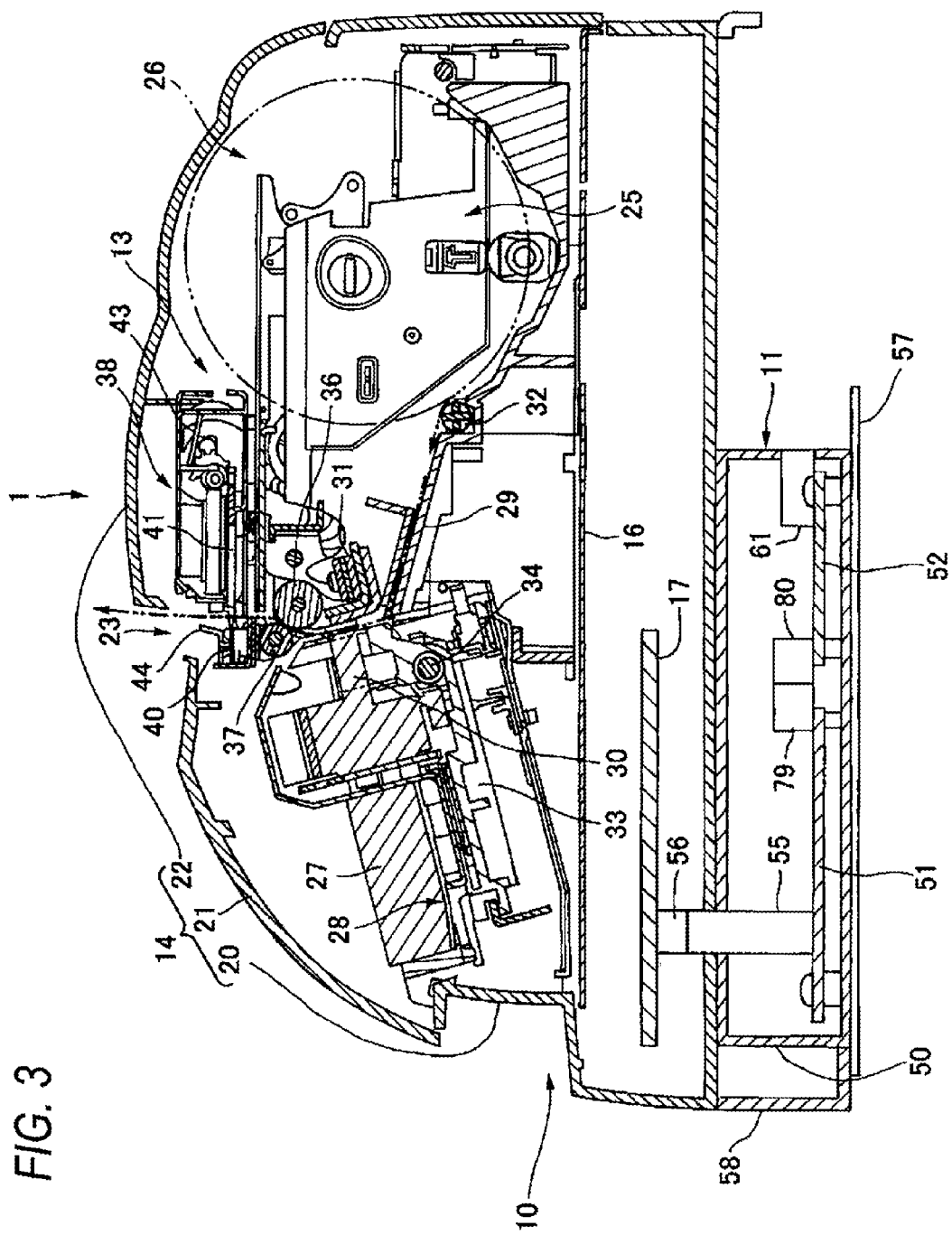
FIG. 3 is a schematic longitudinal sectional view of the fiscal printer.

FIG. 1 is a perspective view showing the appearance of a fiscal printer 1 according to this embodiment when the fiscal printer is viewed obliquely from the front side, FIG. 2 is a perspective view showing the appearance of the fiscal printer 1 when the fiscal printer is viewed obliquely from the rear side, and FIG. 3 is a schematic longitudinal sectional view of the fiscal printer 1.

The fiscal primer 1 according to this embodiment is connected to a host computer 70 (FIG. 4) such as a POS terminal, issues a receipt under the control of the host computer 70, and stores data including fiscal information that is input from the host computer 70. The fiscal information is information on sales transactions of goods and the like (information on sales, information on taxation, or the like), and is information that is predetermined as information to be stored. This fiscal information is used as information that is referred to by a state institution to determine the exact state of transactions in a shop when, for example, the state institution such as the government collects taxes from the shop. In this embodiment, two kinds of data, that is, daily sales data 71 and written receipt data 76 to be described below exist as the data including the fiscal information.

The fiscal printer 1 includes a printer main body 10 and a fiscal unit 11 (a fiscal board receiving case) that is mounted on the bottom of the printer main body 10. A rectangular frame-shaped base part 58, which forms the foundation of the fiscal printer 1, is mounted on the lower surface of the printer main body 10, and the fiscal unit 11 is received in the base part 58. Specifically, as shown in FIG. 2, the fiscal unit 11 is received in the base part 58 at a predetermined receiving position while being interposed between the bottom surface of the printer main body 10 and a fixing plate 57. The fixing plate 57 is fixed to the fiscal unit 11 by screws, and is fixed to the base part 58 by screws. Accordingly, the fiscal unit 11 is fixed to the base part 58.

The printer main body 10 includes a main body unit 13 and a main body case 14 that receives the main body unit 13. As described below, the main body unit 13 is provided with a sheet roll receiving portion 25, components of a sheet roll conveying mechanism, and mechanisms and devices for issuing a receipt such as a printing head 30. Further, a relay board 17 is provided below the lower surface of a bottom plate 16 of the main body unit 13.

The main body case 14 includes a rectangular frame-shaped portion 20 that covers four peripheral side surfaces of the main body unit 13, a front opening/closing lid 21 that covers the front portion of the upper surface of the fiscal printer 1, and a rear opening/closing lid 22 that covers the rear portion of the upper surface of the fiscal printer. A recording sheet outlet 23, which extends in a width direction, is formed between the front opening/closing lid 21 and the rear opening/closing lid 22. If a slide button 24 disposed on the side of the recording sheet outlet 23 is operated, a lock mechanism (not shown) of the rear opening/closing lid 22 is released, so that the rear opening/closing lid 22 can be opened. If the rear opening/closing lid 22 is opened, the sheet roll receiving portion 25, which receives a recording sheet roll 26, of the main body unit 13 is exposed to the outside, so that it may be possible to make a replacement of the recording sheet roll 26 and the like. Further, if the front opening/closing lid 21 is opened, a ribbon cassette mounting portion 28 where a ribbon cassette 27 of an ink ribbon is detachably mounted is exposed to the outside, so that it may be possible to make a replacement of the ribbon cassette 27 and the like.

The sheet roll receiving portion 25, which is covered with the rear opening/closing lid 22, is formed at the rear portion of the main body unit 13. A recording sheet, which is drawn from the recording sheet roll 26 provided in the sheet roll receiving portion, is guided to a recording sheet conveying path 29 through a guide roller 32 that is disposed at the front end portion of the sheet roll receiving portion 25. Meanwhile, a recording sheet, which is conveyed along the recording sheet conveying path 29, is shown in FIG. 3 by a dashed-dotted line. A dot impact type printing head 30 and a platen 31, which faces the dot impact type printing head with a constant distance therebetween, are disposed at a position on the recording sheet conveying path 29. The printing head 30 is mounted on the head carriage 33, and the head carriage 33 can reciprocate along a carriage guide shaft 34 in the width direction.

A ribbon cassette mounting portion 28 for the ribbon cassette 27 is formed at the head carriage 33.

A sheet feed mechanism is disposed on the recording sheet conveying path 29 at a position on the downstream side of the printing head 30. The sheet feed mechanism includes a sheet feed roller 36, a sheet pressing roller 37, and a pushing member (not shown) that pushes the sheet pressing roller 37 against the sheet feed roller 36. The downstream end of the recording sheet conveying path 29 communicates with the recording sheet outlet 23, and a scissor type automatic cutting unit 38 for cutting a recording sheet is disposed near the recording sheet outlet 23. The automatic cutting unit 38 includes a stationary blade 40 that is disposed on the front side of the conveying path of a recording sheet, a movable blade 41 that is disposed on the rear side of the conveying path, and a drive mechanism 43 that operates the movable blade 41. Further, a cutting blade 44, which can cut a recording sheet by a manual operation, is mounted at the front edge portion of the recording sheet outlet 23.

The fiscal unit 11 is mounted on the bottom of the printer main body 10, The fiscal unit 11 includes a box-like fiscal unit case 50, and a printer board 51 and a management board 52 are received in the fiscal unit case 50.

As shown in FIG. 3, a printer-connection connector 55 is mounted on the printer board 51 and the printer-connection connector 55 is connected to a relay board-side connector 56 mounted on the relay board 17, so that the printer board 51 and the relay board 17 are connected to each other. The relay board 17 is connected to the mechanisms and devices for issuing a receipt, such as a carriage drive motor (not shown) that drives the above-mentioned head carriage 33, a guide roller 32 that conveys the recording sheet of the recording sheet roll 26, a medium feed motor (not shown) that rotates the sheet feed roller 36, an actuator (not shown) that drives the printing head 30, and the drive mechanism 43 that operates the movable blade 41. The relay board 17 outputs control signals and drive current to these mechanisms and devices and controls these mechanisms and devices on the basis of control signals input from the printer board 51.

Meanwhile, the configuration of the fiscal unit 11 will be described in detail below.

Figure 4:
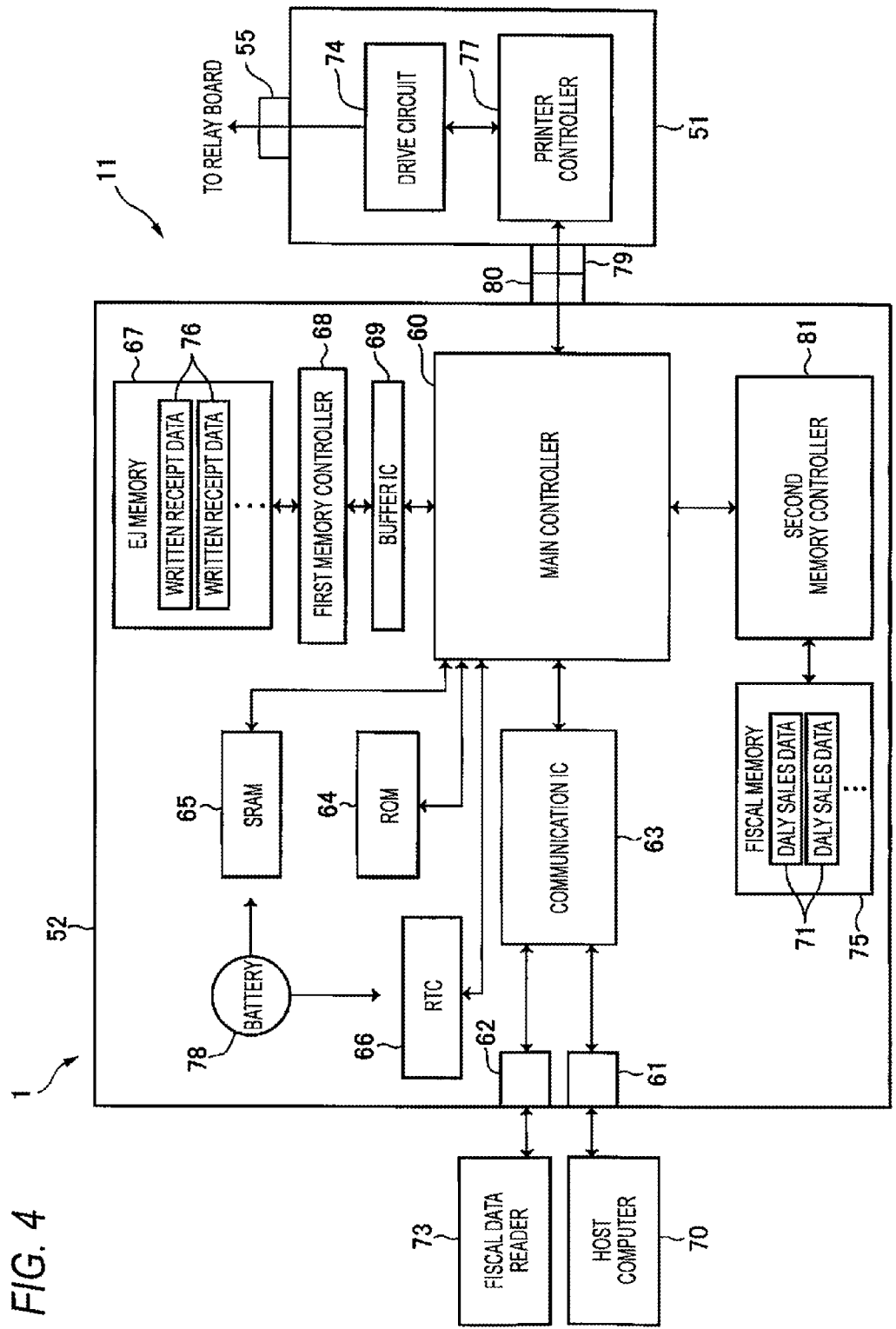
FIG. 4 is a view showing the circuit configuration of the fiscal printer.

FIG. 4 is a view showing the circuit configuration of the fiscal printer 1. In particular, FIG. 4 schematically shows the circuit configuration of the management board 52 and the printer board 51 that are provided in the fiscal unit case 50 of the fiscal unit 11.

As shown in FIG. 4, a main controller 60, a PC connector 61 (external device connector), a fiscal connector 62 (external device connector), a communication IC 63, a ROM 64, an SRAM 65, a RTC 66, an EJ (electric journal) memory 67 (memory), a first memory controller 68, a buffer IC 69, a second memory controller 81, and a fiscal memory 75 (memory) are mounted on the management board 52.

The main controller 60 centrally controls the respective components of the fiscal printer 1, and includes a CPU or other peripheral circuits, The PC connector 61 is a connector to which the host computer 70 (external device) is connected when the fiscal printer 1 is usually used. The host computer 70 outputs a print command, which is related with the issuing of a receipt, to the fiscal printer 1 through the PC connector 61, and outputs daily sales data 71 that is data including fiscal information.

The fiscal connector 62 is a connector to which a fiscal data reader 73 (external device) is connected. The fiscal data reader 73 is a device for reading data stored in the EJ memory 67 or the fiscal memory 75 (memory) to be described below. Only a person, who has special permission, such as a person associated with a state institution (the government or the like) may possess the fiscal data reader.

The communication IC 63 is connected to the PC connector 61 and the fiscal connector 62, and transmits/receives data to/from the host computer 70 or the fiscal data reader 73 under the control of the main controller 60.

The ROM 64 stores control data, a control program that is used to perform various kinds of control by the main controller 60, or the like. In this embodiment, a memory in which data can be rewritten such as an EEPROM is used as the ROM 64.

The SRAM 65 is a volatile memory that functions as a work area of the CPU of the main controller 60, and temporarily stores various kinds of data.

While a power source of the fiscal printer 1 is turned on and power is supplied to the fiscal printer 1 from the commercial power source, power is also supplied to the SRAM 65 from the commercial power source. Meanwhile, while the power source of the fiscal printer 1 is turned off and power is not supplied to the fiscal printer 1 from the commercial power source, power is supplied to the SRAM 65 from a battery 78 (power source).

The RTC 66 (real-time clock) outputs data, which represents current date and time (date and time), to the main controller 60.

The EJ memory 67 is a NAND type flash memory, and can store large data. The EJ memory 67 functions as a memory in which data can be written only one time for one address under the control of the first memory controller 68. Accordingly, the data written in the EJ memory 67 is prevented from being edited later, so that the falsification of the data stored in the EJ memory 67 is prevented.

The first memory controller 68 includes a CPU, and reads and writes data from and in the EJ memory 67 under the control of the main controller 60. When the first memory controller 68 writes data, specifically, written receipt data 76 (to be described below), which is data including fiscal information, in the EJ memory 67, the first memory controller 68 writes data after encrypting the data. Only the set device, which is officially given permission to read the data including fiscal information, such as the above-mentioned fiscal data reader 73 has a function of decrypting the encrypted data. Accordingly, the leakage of the contents of the written receipt data 76 is prevented.

The buffer IC 69 controls a buffer that is provided to improve efficiency in reading and writing data from and in the EJ memory 67.

The EJ memory 67, the first memory controller 68, and the buffer IC 69 are sealed on the management board 52 by an epoxy resin. Accordingly, the data stored in the EJ memory 67 is prevented from being falsified after the EJ memory 67 is physically separated from the management board 52. One or both of the EJ memory 67 and the fiscal memory 75 may be referred to as a fiscal memory. Further, the information of both of the EJ memory and the fiscal memory may be stored in one memory.

The fiscal memory 75 is a nonvolatile memory that includes a flash ROM or an EPROM. The daily sales data 71 has been stored in the fiscal memory 75, which will be described below. The fiscal memory 75 functions as a memory in which data can be written only one time for one address under the control of the second memory controller 81. Accordingly, the data written in the fiscal memory 75 is prevented from being edited later, so that the falsification of the data stored in the fiscal memory 75 is prevented.

The second memory controller 81 includes a CPLD (complex programmable logic device) that is a device in which a programmable logic circuit is written, and reads and writes data from and in the fiscal memory 75 under the control of the main controller 60. When the second memory controller 81 writes data, specifically, daily sales data 71 (to be described below which is data including fiscal information, in the fiscal memory 75, the second memory controller 81 writes data after encrypting the data. Here, only the set device, which is officially given permission to read the data including fiscal information, such as the above-mentioned fiscal data reader 73 has a function of decrypting the encrypted data. Accordingly, the leakage of the contents of the daily sales data 71 is prevented.

The fiscal memory 75 and the second memory controller 81 are sealed on the management board 52 by an epoxy resin. Accordingly, the data stored in the fiscal memory 75 is prevented from being falsified after the fiscal memory 75 is physically separated from the management board 52.

A printer controller 77 and a drive circuit 74 are mounted on the printer board 51.

The printer controller 77 centrally controls the respective components of the fiscal printer 1, and includes a CPU as an arithmetic operation unit or other peripheral circuits.

The drive circuit 74 outputs control signals and drive current to the mechanisms and devices for issuing a receipt, such as a carriage drive motor (not shown) that drives the above-mentioned head carriage 33 under the control of the printer controller 77, a guide roller 32 that conveys the recording sheet of the recording sheet roll 26, a medium feed motor (not shown) that rotates the sheet feed roller 36, an actuator (not shown) that drives the printing head 30, and the drive mechanism 43 that operates the movable blade 41, through the relay board 17. The drive circuit 74 controls the mechanisms and devices.

A printer board-side connector 79 is mounted on the printer board 51, a management board-side connector 80 is mounted on the management board 52, and the printer board-side connector 79 and the management board-side connector 80 are connected to each other. Accordingly, the management board 52 and the printer board 51 are connected to each other.

In this embodiment, at the time of the issuing of a receipt, first, the host computer 70 connected to the fiscal printer 1 generates a prim command and outputs the generated print command to the main controller 60 through the PC connector 61. The main controller 60 to which the print command has been input outputs the input print command to the printer controller 77.

Next, the written receipt data 76 stored in the EJ memory 67 and the daily sales data 71 stored in the fiscal memory 75 will be described. As described above, these data correspond to the data including the fiscal information.

The written receipt data 76 is data that represents information recorded on the receipt issued by the fiscal printer 1, and is data that is predetermined as data to be stored. For example, when the information on the goods, the information on the unit price of the goods, the information on the number of the bought goods, the information on the payment required to buy the goods, the information on the total payment required to buy all the goods, or the like is recorded on a receipt in regard to all the goods bought by customers, data representing this information correspond to the written receipt data 76 if the data representing these information is predetermined as data to be stored. As described above, in this embodiment, when a receipt is issued by the fiscal printer 1, a print command is generated by the host computer 70, the print command is output to the main controller 60, and the print command is output to the printer controller 77 from the main controller 60. In this case, the main controller 60 extracts information, which is to be stored as the written receipt data 76, from the print command, controls the first memory controller 68, and stores the extracted information in the EJ memory 67 as the written receipt data 76.

The daily sales data 71 is data representing the total daily sales of a shop. After the shop is closed, the host computer 70 calculates the total daily sales of the shop, generates the daily sales data 71 on the basis of the calculated total sales, and outputs the generated daily sales data 71 to the main controller 60. When the daily sales data 71 is input to the main controller, the main controller 60 controls the second memory controller 81 and writes the daily sales data 71 in the fiscal memory 75.

Next, the configuration of the fiscal unit 11 will be described.

Figure 5:
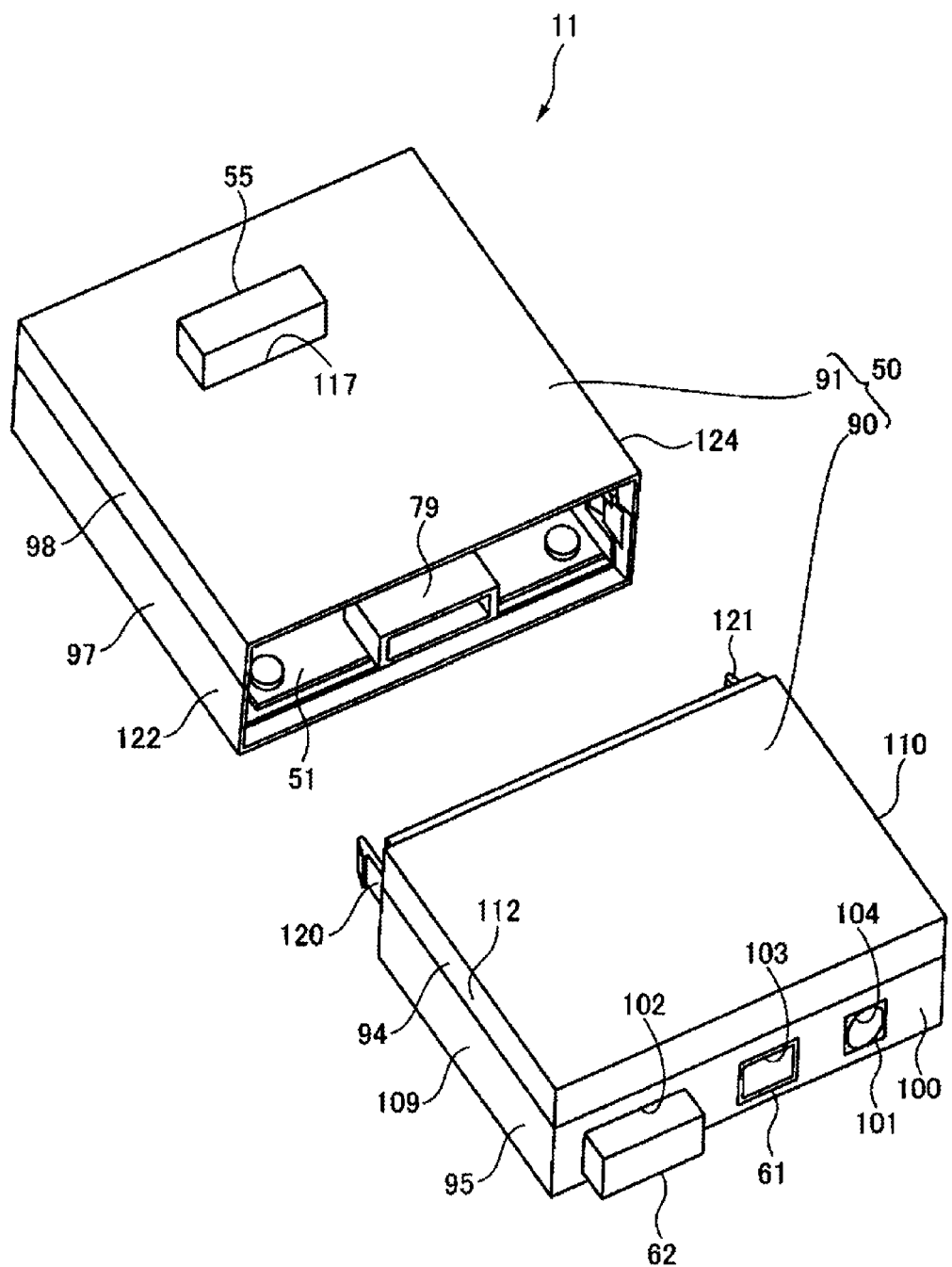
FIG. 5 is a perspective view showing the appearance of a fiscal unit.
Figure 6:
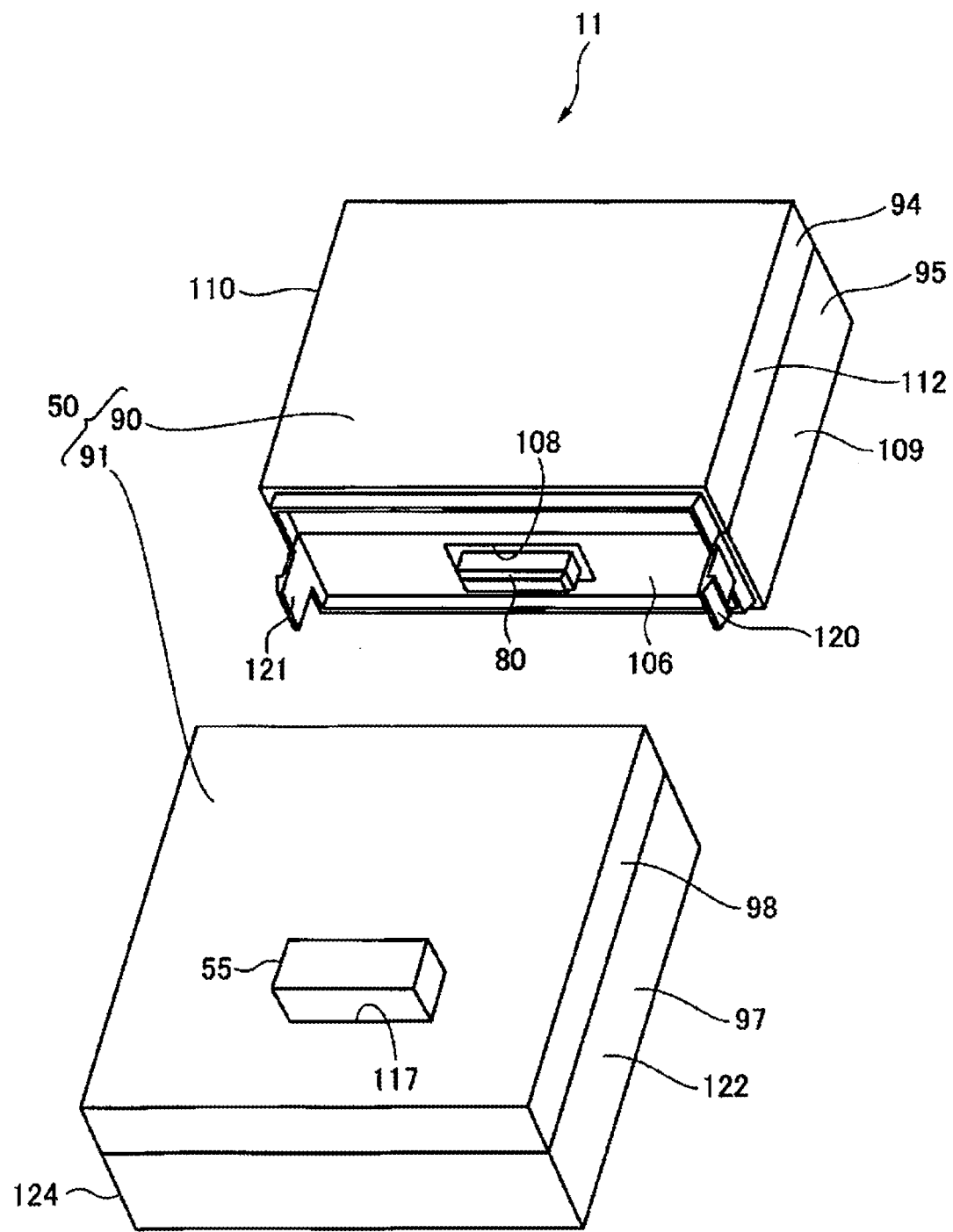
FIG. 6 is a perspective view showing the appearance of the fiscal unit.
Figure 7:
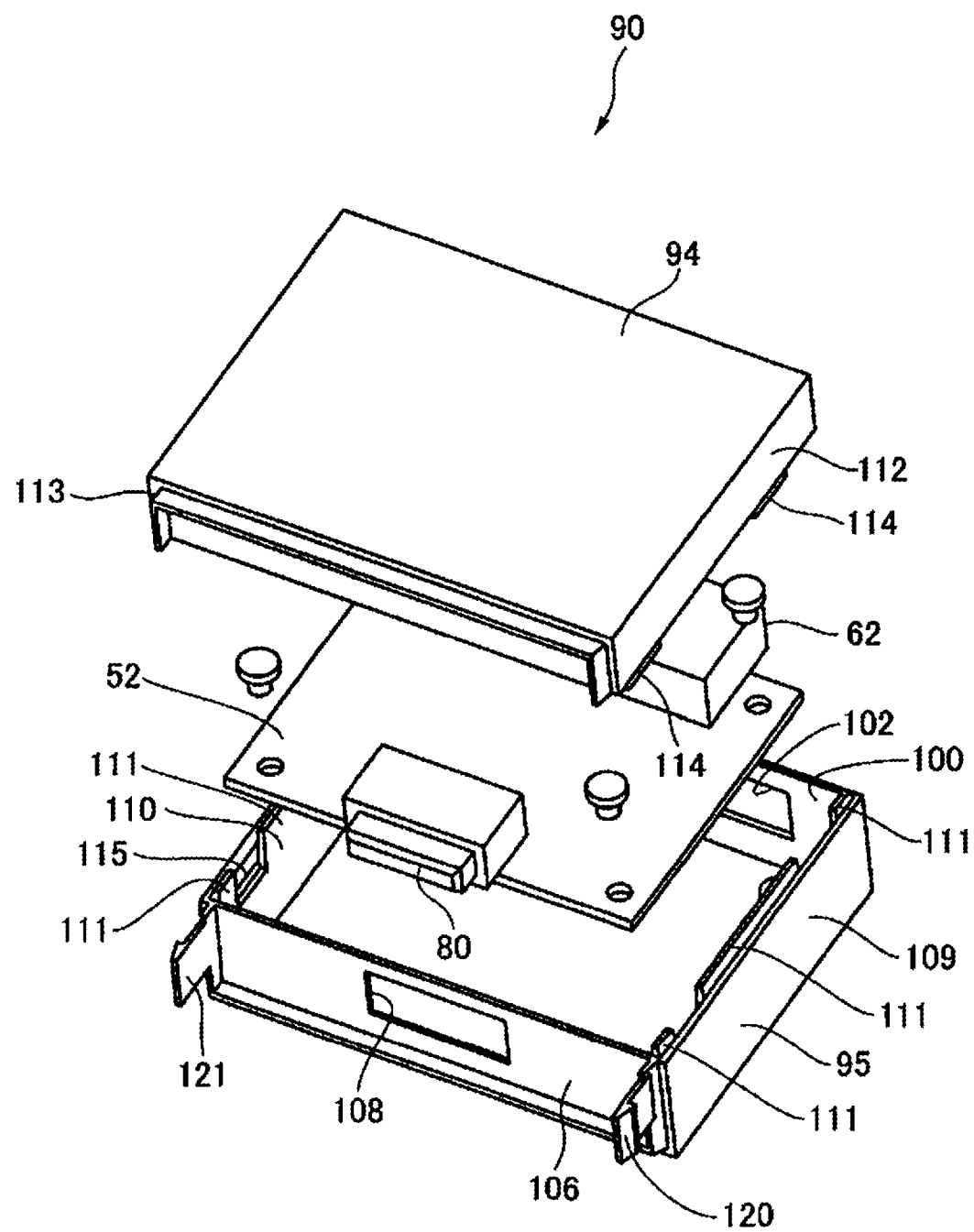
FIG. 7 is a perspective view showing the appearance of a management board receiving case.

FIG. 5 is a perspective view of the fiscal unit 11 where a management board receiving case 90 is separated from a printer board receiving case 91, when the fiscal unit is viewed from the rear side of the management board receiving case 90. FIG. 6 is a perspective view of the fiscal unit 11 where the management board receiving case 90 is separated from the printer board receiving case 91, when the fiscal unit is viewed from the rear side of the printer board receiving case 91. FIG. 7 is a perspective view of the management board receiving case 90 where a management board case lid 94 (lid) is separated from a management board case main body 95 (case main body).

Figure 8:
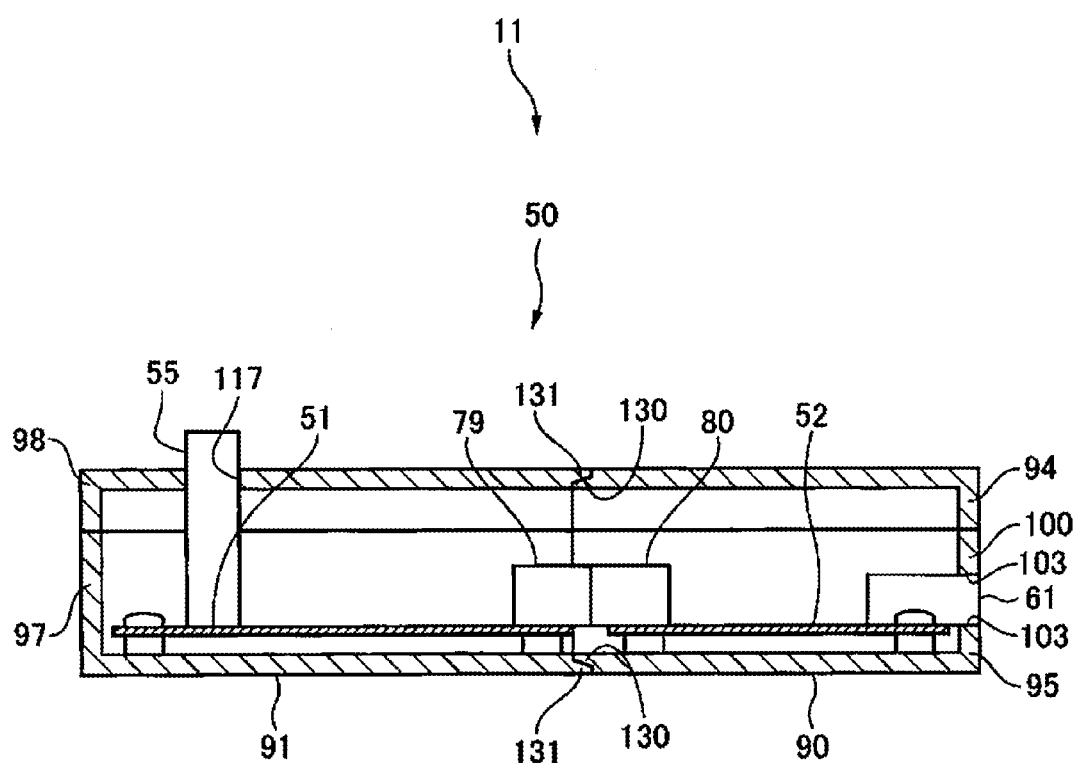
FIG. 8 is a schematic longitudinal sectional view of the fiscal unit.
Figure 9A:
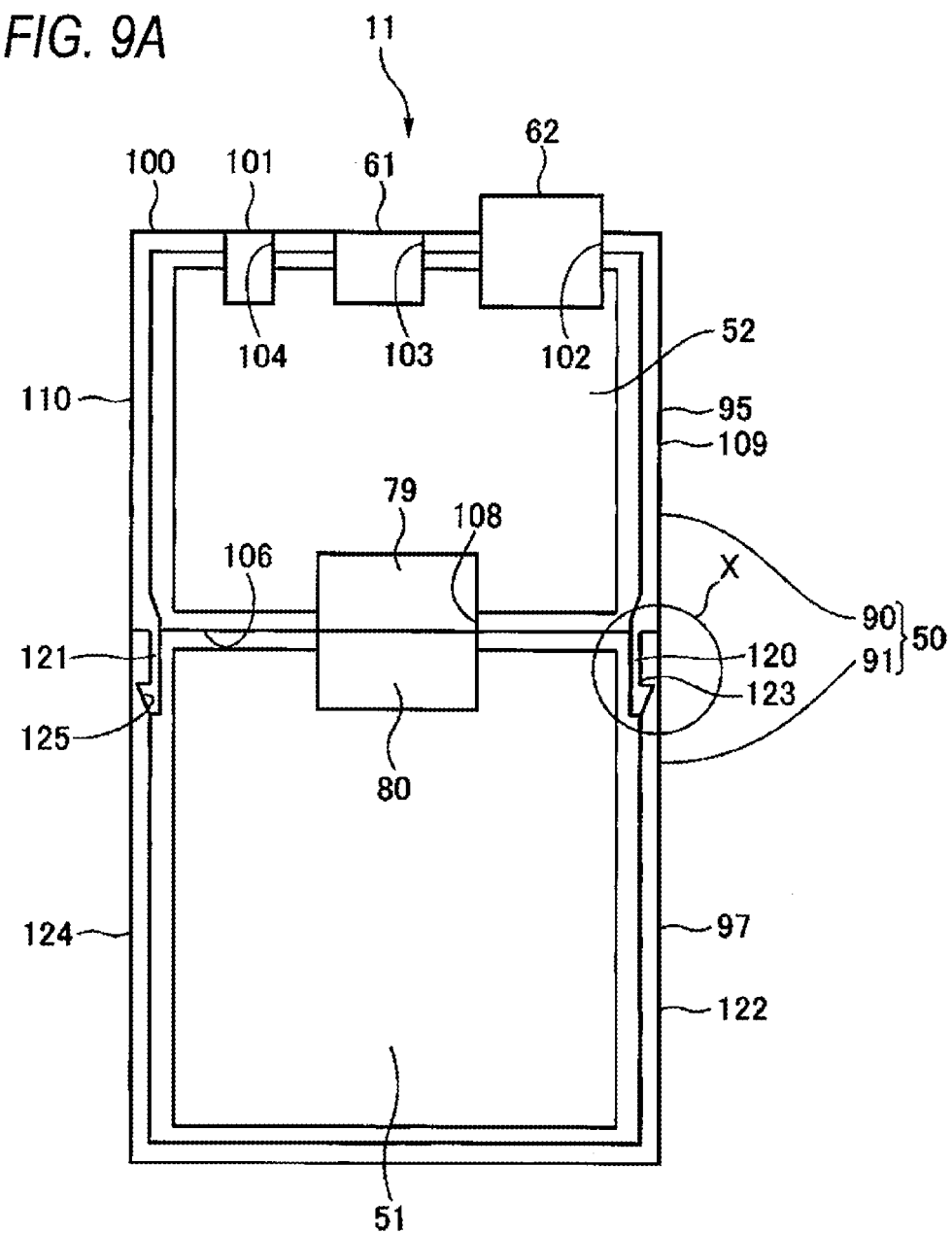
FIG. 9A is a view of the fiscal unit as viewed from above.
Figure 9B:
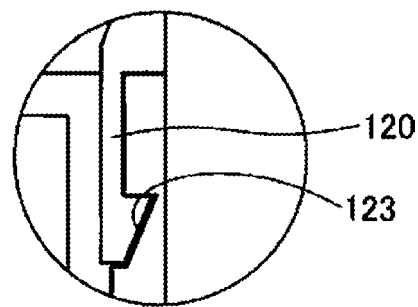
FIG. 9B is an enlarged view of an area X shown in FIG. 9A.
Figure 10:
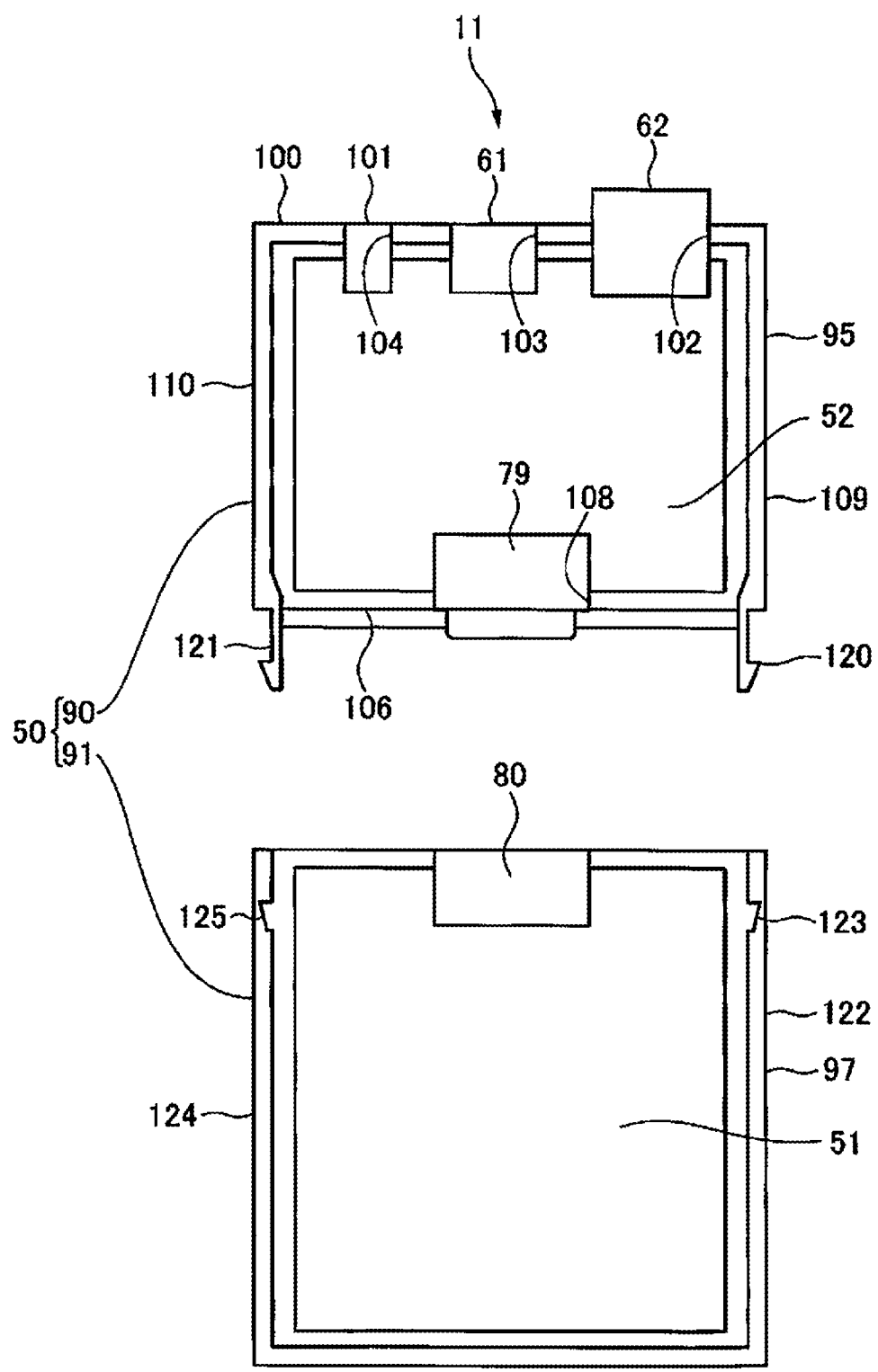
FIG. 10 is a view of the fiscal unit as viewed from above.

Further, FIG. 8 is a longitudinal sectional view of the fiscal unit 11. FIG. 9A is a view showing that the case main bodies are connected (engaged) with each other after the management board case lid 94 is separated from the management board case main body 95 of the management board receiving case 90 and a printer board case lid 98 (lid) is separated from a printer board case main body 97 (case main body) of the printer board receiving case 91, as viewed from above. FIG. 9B is an enlarged view of an area X of FIG. 9A. FIG. 10 is a view showing that the respective case main bodies of FIG. 9A are separated from each other.

As shown in FIGS. 5 and 6, the fiscal unit case 50 of the fiscal unit 11 includes two cases, that is, a management board receiving case 90 and a printer board receiving case 91. These cases are connected to each other so as to form one box-like body, so that the fiscal unit case 50 is formed.

The management board receiving case 90 is a case that receives the management board 52. As shown in FIG. 7, the management board receiving case 90 includes a box-like management board case main body 95 and a box-like management board case lid 94. The management board case main body 95 and the management board case lid 94 are connected to each other so that an opening of the management board case main body 95 and an opening of the management board case lid 94 face each other. As a result, the box-like management board receiving case 90, which receives the management board 52 therein, is formed.

As shown in FIGS. 5, 9A, and 10, connector holes 102, 103, and 104 are formed at one side surface 100 of the management board case main body 95. The fiscal connector 62, the PC connector 61, and a power source connector 101 are exposed to the outside of the management board case main body 95 through the connector holes 102, 103, and 104, respectively. The connectors 61, 62, and 101 pass through the connector holes 103, 102, and 104, respectively, so that the respective connectors 61, 62, and 101 are exposed to the outside. Here, the connector holes 103, 102, and 104 are formed so as to be closed by the connectors 61, 62, and 101, respectively, when the connectors 61, 62, and 101 pass through the connector holes 103, 102, and 104, respectively. For example, in the case of the connector hole 102 through which the fiscal connector 62 passes, the shape of the inner periphery of the connector hole 102 is substantially the same as that of the outer periphery of the fiscal connector 62.

Accordingly, the connector hole 102 is closed by the fiscal connector 62. After the management board case lid 94 is connected to the management board case main body 95, physical access to the inside of the management board receiving case 90 through the respective connector holes 102, 103, and 104 is prevented due to this structure, Further, as shown in FIGS. 6 and 7, a connector hole 108 is formed at the side surface 106, which faces the side surface 100, of side surfaces of the management board case main body 95. The management board-side connector 80 is exposed to the outside through the connector hole 108. The connector hole 108 is also formed so as to be closed by the management board-side connector 80 when the management board-side connector 80 passes through the connector hole 108. Accordingly, after the management board case lid 94 is connected to the management board case main body 95, physical access to the inside of the management board receiving case 90 through the connector hole 108 is prevented.

Referring to FIG. 7, locking pieces 111 are formed with a distance therebetween at the side surfaces 109 and 110 that are the side surfaces of the management board case main body 95 other than the side surfaces 100 and 106, Locking piece receivers (not shown) to which the locking pieces 111 are snap-fitted are formed on the management board case lid 94 at positions corresponding to the locking pieces 111.

Likewise, locking pieces 114 are formed on the side surfaces 112 and 113 of the management board case lid 94, which correspond to the side surfaces 109 and 110 of the management board case main body 95, so as to avoid the locking pieces 111 of the management board case main body 95. Locking piece receivers 115 to which the locking pieces 114 are irreversibly snap-fitted are formed on the management board case main body 95 at positions corresponding to the locking pieces 114.

The above-mentioned locking pieces 111 are locked to the locking piece receivers corresponding to the locking pieces 111 and the locking pieces 114 are locked to the locking piece receivers 115 corresponding to the locking pieces 114, so that the management board case main body 95 and the management board case lid 94 are irreversibly connected (engaged) with each other. Further, after the management board case main body 95 and the management board case lid 94 are connected to each other once (a state shown in FIGS. 5 and 6), physical access to a space surrounded by the management board case main body 95 and the management board case lid 94, that is, the inside of the management board receiving case 90 is blocked. When physical access to the inside is not possible as described above, the lock between the respective locking pieces and the respective locking piece receivers is irreversibly maintained and cannot be released. Accordingly, the connection between the management board case main body 95 and the management board case lid 94 cannot be released. That is, after the management board case main body 95 and the management board case lid 94 are connected to each other once, the connection between the case main body and the case lid cannot be released and access to the inside of the management board receiving case 90 is blocked in this embodiment. Accordingly, physical access to the EJ memory 67 or the fiscal memory 75 mounted on the management board 52 is blocked, so that the falsification of data performed through physical access to the memory is prevented.

in particular, the management board case lid 94 is connected to the management board case main body 95 in this embodiment, so that it may be possible to block physical access to the EJ memory 67 or the fiscal memory 75 afterward. That is, physical access to the management board 52 can be blocked by the management board receiving case 90 as a single body. For this reason, before the management board receiving case 90 is connected to the printer board receiving case 91, it may be possible to prevent physical access to the management board 52 that is received in the management board receiving case 90. Accordingly, for example, when the management board receiving case 90 is not connected to the printer board receiving case 91 yet during manufacture or shipment, it may be possible to reliably prevent illegal processing (alteration or the like of a circuit) from being performed on the management board 52.

The printer board receiving case 91 is a case that receives the printer board 51. As shown in FIGS. 5 and 6, the printer board receiving case 91 includes a printer board case main body 97 and a box-like printer board case lid 98. As shown in FIG. 5, the printer board case main body 97 is a box-like case of which the lower surface and one side surface are opened. Likewise, the printer board case lid 98 is a box-like case of which the lower surface and one side surface are opened. Further, the printer board case main body 97 and the printer board case lid 98 are connected to each other so that an opening of the lower surface of the printer board case main body 97 and an opening of the lower surface of the printer board case lid 98 face each other. As a result, the box-like printer board receiving case 91 of which one side surface is opened is formed.

A connector hole 117 through which the printer-connection connector 55 passes is formed at the printer board case lid 98. The printer-connection connector 55 passes through the connector hole 117, so that the printer-connection connector 55 is exposed to the outside. The shape of the inner periphery of the connector hole 117 is substantially the same as that of the outer periphery of the printer-connection connector 55. Accordingly, when the printer-connection connector 55 passes through the connector hole 117, the connector hole 117 is closed by the printer-connection connector 55. Therefore, physical access to the inside of the printer board receiving case 91 through the connector hole 117 is prevented when the printer board receiving case 91 and the management board receiving case 90 are connected to each other.

Like the management board case main body 95 and the management board case lid 94 described above, the printer board case main body 97 and the printer board case lid 98 are connected to each other by the irreversible engagement between locking pieces and locking piece receivers that are formed in the case main body and the case lid. Further, after the printer board receiving case 91 and the management board receiving case 90 are connected to each other, physical access to the locking pieces and the locking piece receivers, which are formed at the printer board case main body 97 and the printer board case lid 98, is not possible as described below. Accordingly, the engagement between the locking pieces and the locking piece receivers is irreversibly maintained and cannot be released. That is, after the printer board case main body 97 and the printer board case lid 98 are connected to each other and the printer board receiving case 91 and the management board receiving case 90 are then connected to each other, the connection between the printer board case main body 97 and the printer board case lid 98 cannot be released and physical access to the printer board 51 received in the printer board receiving case 91 is not possible.

Next, the aspect of the connection between the management board receiving case 90 and the printer board receiving case 91 will be described.

Referring to FIG. 10, connection locking pieces 120 and 121 (engagement members) protrude from the side surfaces 109 and 110 of the management board receiving case 90. Further, a connection locking piece receiver 123 (engagement member), to which the connection locking piece 120 is irreversibly snap-fitted, is formed at the side surface 122 of the printer board receiving case 91 that corresponds to the side surface 109 of the management board receiving case 90. A connection locking piece receiver 125 (engagement member), to which the connection locking piece 121 is irreversibly snap-fitted, is formed at the side surface 124 that corresponds to the side surface 110 of the management board receiving case 90.

When a state is changed from a state where the management board receiving case 90 and the printer board receiving case 91 are not connected to each other (FIG. 10) to a state where these cases are connected to each other (FIG. 9A), these cases are connected to each other so that the side surface 106 of the management board receiving case 90 faces the opening (one side surface) of the printer board receiving case 91. Accordingly, as shown in FIG. 9A, the management board-side connector 80 exposed from the side surface 106 of the management board receiving case 90 is connected to the printer board-side connector 79 exposed from the opening of the printer board receiving case 91 and the connection locking pieces 120 and 121 are irreversibly snap-fitted to the connection locking piece receivers 123 and 125 (see FIGS. 9A and 9B).

Further, while the management board receiving case 90 and the printer board receiving case 91 are connected to each other, a positioning portion 130 formed at the edge of the management board receiving case 90 facing the printer board receiving case 91 is engaged with a positioning portion 131 formed at the edge of the printer board receiving case 91 facing the management board receiving case 90 as shown in FIG. 8. Accordingly, the movement of the management board receiving case 90 relative to the printer board receiving case 91 is restricted in a vertical direction.

After the connection locking pieces 120 and 121 are irreversibly snap-fitted to the connection locking piece receivers 123 and 125, the fiscal unit case 50 is formed as one box-like body of which an inner space is sealed as shown in FIGS. 8, 9A and 9B. Accordingly, physical access to the inside of the fiscal unit case 50 is not possible and the engagement between the connection locking pieces 120 and 121 and the connection locking piece receivers 123 and 125 is maintained and cannot be released, That is, after the management board receiving case 90 and the printer board receiving case 91 are connected to each other, physical access to the inside of the fiscal unit case 50 formed by these cases is not possible. Accordingly, it may be possible to prevent falsification that is performed through physical access to the management board 52 or the printer board 51.

As described above, in this embodiment, the fiscal printer 1 includes the management board receiving case 90 and the printer board receiving case 91. The management board receiving case 90 is a case that is formed by connecting the management board case lid 94 to the management board case main body 95. The management board receiving case 90 receives the management board 52 on which the EJ memory 67 or the fiscal memory 75 and the management board-side connector 80 are mounted. The EJ memory 67 or the fiscal memory 75 stores the daily sales data 71 or the written receipt data 76 that is the data including fiscal information. The printer board receiving case 91 is a case that is formed by connecting the printer board case lid 98 to the printer board case main body 97. The printer board receiving case 91 receives the printer board 51 on which the printer controller 77 and the printer board-side connector 79 connected to the management board-side connector 80 are mounted. Further, the management board receiving case 90 and the printer board receiving case 91 are connected to each other by the engagement members (the locking pieces and the locking piece receivers) provided in these cases, so that one box-like body (fiscal unit case 50) for receiving the management board 52 while access from the outside is not possible is formed. Furthermore, after these cases are connected to each other, the connection between the cases is irreversibly maintained and cannot be released. Moreover, the connection between the case main body and the lid of each of the cases is irreversibly maintained and cannot be released.

According to this, after one box-like body (fiscal unit case 50) for receiving the management board 52 while access from the outside is not possible is formed by connecting the management board receiving case 90 to the printer board receiving case 91, it may not be possible to separate these cases. Accordingly, after these cases are connected to each other, a state where access to the management board 52 on which the EJ memory 67 or the fiscal memory 75 is mounted is not possible is maintained. Therefore, it may be possible to prevent the falsification of data that is performed through physical access to these memories.

Further, in this embodiment, the management board-side connector 80 is exposed from one side surface 106 of the management board receiving case 90 and the printer board-side connector 79 is exposed from the opening (one side surface) of the printer board receiving case 91. Furthermore, the management board receiving case 90 and the printer board receiving case 91 are connected to each other by the engagement members provided in these cases so that the side surface 106 of the management board receiving case 90 and the opening of the printer board face each other. Accordingly, one box-like body (fiscal unit case 50) is formed so that the management board-side connector 80 and the printer board-side connector 79 are connected to each other.

According to this, it may be possible to connect the management board receiving case 90 to the printer board receiving case 91 so that the management board-side connector 80 is connected to the printer board-side connector 79.

Moreover, in this embodiment, the fiscal connector 62 or the PC connector 61 connected to the fiscal data reader 73 or the host computer 70, which is an external device, is mounted on the management board 52. The connector holes 102 and 103 through which the connectors are exposed to the outside of the management board receiving case 90 are formed at the management board receiving case 90. Further, the connector holes 102 and 103 are formed so as to be closed by the connectors when the PC connector 61 or the fiscal connector 62 passes through the connector holes 102 and 103.

According to this, it may be possible to prevent physical access to the memories through the connector holes 102 and 103.

Furthermore, in this embodiment, the written receipt data 76 or the daily sales data 71 is stored in the EJ memory 67 or the fiscal memory 75 after being encrypted.

According to this, it may be possible to prevent the falsification of data, which is performed through physical access to these memories, while preventing the illegal reading of the data stored in the EJ memory 67 or the fiscal memory 75.

Meanwhile, the above-mentioned embodiment is merely an aspect of the invention, and may be arbitrarily modified and applied within the scope of the invention.

For example, the fiscal printer 1 has been a dot impact printer in the above-mentioned embodiment. However, the printer is not limited to the dot impact printer and may be an inkjet printer or a thermal printer.

Further, the PC connector 61, the fiscal connector 62, or the like has been provided in the above-mentioned embodiment.

However, a short-range radio communication device may be provided in the fiscal unit 11, and data may be interchanged by wireless between the fiscal unit and the host computer 70 or the fiscal data reader 73 with the short-range radio communication device. Accordingly, the connector holes 102 and 103 may not be formed at the management board receiving case 90. According to this, it may be possible to further prevent physical access to the management board 52 and to more reliably prevent falsification.

What is claimed is:

1. A fiscal board receiving case, comprising:
   a management board case that includes a case main body and a lid connected to the case main body and receives a management board on which a memory storing data including fiscal information and a management board-side connector are mounted; and
   a control board case that includes a case main body and a lid connected to the case main body and receives a control board on which a controller and a control board-side connector connected to the management board-side connector are mounted,
   wherein the management board case and the control board case are configured such that one box-like body that receives at least the management board is formed while the management board-side connector and the control board-side connector are connected to each other by engaging the management board case with the control board case through engagement members provided in the cases, and
   wherein the management board case and the control board case are configured such that engagement between the cases and engagement between the case main body and the lid in each of the cases are irreversibly maintained after the cases are engaged with each other.

2. The fiscal board receiving case as set forth in claim 1, wherein the management board-side connector is exposed from one side surface of the management board case and the control board-side connector is exposed from one side surface of the control board case, and
   wherein the management board case and the control board case are configured such that the one box-like body is formed while the management board-side connector and the control board-side connector are connected to each other by engaging the management board case with the control board case through the engagement members provided in the cases in a state where the one side surface of the management board case faces the one side surface of the control board case.

3. The fiscal board receiving case as set forth in claim 1, wherein an external device connector which is connectable to an external device is mounted on the management board,
   wherein the management board case is formed with a connector hole through which the external device connector is exposed to the outside of the management board case, and
   wherein the connector hole is formed such that the connector hole is closed by the external device connector when the external device connector passes through the connector hole.

4. The fiscal board case as set forth in claim 1, wherein the data including the fiscal information is stored in the memory after being encrypted.

5. A fiscal printer, comprising a fiscal board receiving case including:
   a management board case that includes a case main body and a lid connected to the case main body and receives a management board on which a memory storing data including fiscal information and a management board-side connector are mounted; and
   a printer board case that includes a case main body and a lid connected to the case main body and receives a printer board on which a printer controller and a printer board-side connector connected to the management board-side connector are mounted,
   wherein the management board case and the printer board case are configured such that one box-like body that receives at least the management board is formed while the management board-side connector and the printer board-side connector are connected to each other by engaging the management board case with the printer board case through engagement members provided in the cases, and
   wherein the management board case and the printer board case are configured such that engagement between the cases and engagement between the case main body and the lid in each of the cases are irreversibly maintained after the cases are engaged with each other.

\* \* \* \* \*